US011260477B2

(12) United States Patent
Huttner et al.

(10) Patent No.: US 11,260,477 B2
(45) Date of Patent: Mar. 1, 2022

(54) REPAIR TOOL FOR TURBOMACHINERY AND RELATED METHOD

(71) Applicant: MTU Aero Engines AG, Munich (DE)

(72) Inventors: Roland Huttner, Jesenwang (DE); Bernd Kriegl, Olching (DE); Jude Toscano, Newington, CT (US); Matthew Plakunov, Newington, CT (US)

(73) Assignee: MTU Aero Engines AG, Munich (DE)

( * ) Notice: Subject to any disclaimer, the term of this patent is extended or adjusted under 35 U.S.C. 154(b) by 61 days.

(21) Appl. No.: 16/401,204

(22) Filed: May 2, 2019

(65) Prior Publication Data

US 2020/0346310 A1 Nov. 5, 2020

(51) Int. Cl.
| | | |
|---|---|---|
| B23P 6/00 | (2006.01) |
| G01N 21/91 | (2006.01) |
| G01N 27/90 | (2021.01) |
| B23Q 9/00 | (2006.01) |
| G02B 23/24 | (2006.01) |
| F01D 25/00 | (2006.01) |
| F01D 5/00 | (2006.01) |

(52) U.S. Cl.
CPC ............ *B23P 6/002* (2013.01); *B23Q 9/0007* (2013.01); *F01D 25/00* (2013.01); *G01N 21/91* (2013.01); *G01N 27/90* (2013.01); *B23P 2700/01* (2013.01); *F01D 5/005* (2013.01); *F05D 2230/72* (2013.01); *F05D 2230/80* (2013.01); *G02B 23/24* (2013.01)

(58) Field of Classification Search
CPC combination set(s) only.
See application file for complete search history.

(56) References Cited

U.S. PATENT DOCUMENTS

| 4,762,118 | A | * | 8/1988 | Lia | A61B 1/0055 |
| | | | | | 138/120 |
| 5,102,221 | A | * | 4/1992 | Desgranges | B23Q 5/027 |
| | | | | | 356/241.1 |
| 5,644,394 | A | * | 7/1997 | Owens | B23P 6/002 |
| | | | | | 15/324 |
| 6,036,636 | A | * | 3/2000 | Motoki | G02B 23/2476 |
| | | | | | 600/141 |
| 6,371,221 | B1 | * | 4/2002 | Harrigan | E21B 4/04 |
| | | | | | 175/26 |
| 6,531,798 | B1 | * | 3/2003 | Palmero | F16H 25/2018 |
| | | | | | 310/112 |
| 8,786,848 | B2 | * | 7/2014 | Hatcher | F01D 21/003 |
| | | | | | 356/237.1 |
| 2005/0073673 | A1 | * | 4/2005 | Devitt | G01N 3/567 |
| | | | | | 356/37 |

(Continued)

FOREIGN PATENT DOCUMENTS

WO WO-2016076704 A1 * 5/2016 ........... F01D 25/285

*Primary Examiner* — Matthew P Travers
(74) *Attorney, Agent, or Firm* — Davidson, Davidson & Kappel, LLC

(57) ABSTRACT

A guide system for repairing turbomachinery includes a housing; a guide tube have a hollow interior for accepting a working tool module; an axial motor for moving the guide tube axially with respect to the housing; a rotational motor for rotating the guide tube with respect to the housing; and an attachment for securing the housing with respect to a turbomachinery casing. A repair kit and method are also provided.

12 Claims, 2 Drawing Sheets

(56) References Cited

U.S. PATENT DOCUMENTS

| | | | |
|---|---|---|---|
| 2008/0199304 A1* | 8/2008 | Moran | G01J 5/0025 |
| | | | 415/118 |
| 2013/0335530 A1* | 12/2013 | Hatcher, Jr. | F01D 21/003 |
| | | | 348/46 |
| 2015/0054939 A1* | 2/2015 | DeAscanis | G01M 15/14 |
| | | | 348/82 |
| 2018/0058233 A1 | 3/2018 | Norton et al. | |
| 2018/0100396 A1* | 4/2018 | Lipkin | H04N 5/44 |

\* cited by examiner

Section B-B

REPAIR TOOL FOR TURBOMACHINERY AND RELATED METHOD

The present invention is related generally to turbomachinery such as aircraft engines and more particularly to the repair of such turbomachinery.

BACKGROUND

European Patent Application No. EP 0 301 982 describes a self-adjusting steering mechanism for a borescope, endoscope or guide tube, the borescope being intended for example for visual inspection of a mechanical assembly such as a jet engine or turbine. An articulation section formed of washers separated by spacer beads is provided.

WO 2016/076704 describes a method for inspecting or repairing damage of a jet engine via an access opening with a borescope inspection kit having flexible conduits. The borescope has a rigid insertion tube with a distal end. A rotatable head with a fluid applicator on a distal tip extends out of the rigid insertion tube. A camera is arranged for viewing a direction perpendicular to the rigid insertion tube. A rotatable knob can rotate the rotatable head.

WO 2018/071174 discloses a maintenance apparatus that has a flexible carriage that anchors between adjacent airfoils or a turbine assembly and a maintenance tool coupled to the flexible carriage. One or more motors move the maintenance tool relative to the flexible carriage.

U.S. Pat. No. 5,102,221 discloses an apparatus for retouching in situ a defect on a turbomachine rotor. A tube is rigidly connected to a body of the apparatus. A control rod can deploy a tool carrier.

U.S. Pat. No. 8,786,848 discloses a turbine engine inspection system where the lateral extension, rotation and tilt of a camera may be controlled manually or controlled via an automated system. One or more motors in communication with an extendible camera support shaft are configured to rotate the extendible camera support shaft. One or more motors in communication with the extendible camera support shaft also move the extendible camera support shaft longitudinally along the longitudinal axis.

European Patent No. 0 799 366 describes a borescope for repairing damaged gas turbine engines. The borescope has two rigid channels, a borescope channel and a motor channel, having generally the same shape and fixedly attached to each other. The motor channel accommodates a flexible drive cable extending from the attachment end to the working end thereof. The drive cable protrudes through the working end of the motor channel terminating in a mounting tip. An abrasive tip is fixedly attached onto the mounting tip of the drive cable. The drive cable attaches to a drive shaft at the attachment end with the drive shaft protruding from the attachment end of the motor channel.

SUMMARY OF THE INVENTION

The present invention provides a guide system for repairing turbomachinery comprising:
 a housing;
 a guide tube have a hollow interior for accepting working tool modules;
 an axial motor for moving the guide tube axially with respect to the housing;
 a rotational motor for rotating the guide tube with respect to the housing; and
 an attachment for securing the housing with respect to a turbomachinery casing.

The present invention provides a stable and secure guide system that permits insertion and removal of various working tools, for example various inspection cameras or devices, including visual inspection, eddy current inspection and other inspection devices, and well as, blend repair tools, for example a cleaning tool, a material deposition tool, and a coating tool.

All of these tools can fit within the guide tube and have their own actuators for movement or functioning, and also can work in conjunction with the guide tube. For example, a blending milling device for cleaning a repair area may be generally positioned by the guide tube and its movement, and then have its own axial and rotational movement to contact and mill the repair area. The guide tube can be a simple receptacle or also be an integrated version with other functions.

The guide tube thus preferably has its own integrated camera lens, for example a CMOS or CCD camera, preferably at a distal end of the guide tube. The guide tube preferably also has a light source, for example an LED, and also preferably at the distal end of the guide tube.

The guide tube preferably also has a bendable end section, to move the distal end with respect to a longitudinal axis of the guide tube, which then can still rotate and move axially with respect to the housing.

The guide system also preferably includes a controller for receiving information from the integrated camera and for moving the guide tube within the turbomachinery casing to specified axial and radial locations within the casing for example for inspecting rotor blade damage in a turbine compressor. The controller can access a database to both obtain information on the turbomachinery part locations with respect to an access port in the casing used to insert the guide system, and can also store information on the damage found by the guide system with its integrated camera before any tool is inserted.

The guide system also preferably includes a tool attachment for securing the inserted tool to the housing. The housing, which is fixed with respect to the turbomachinery casing, thus provides a stable platform and support for the working tools, and thus autonomous or semi-autonomous processes are easier to accomplish.

The present invention thus also provides a repair kit for turbomachinery comprising the guide system as above, and an inserted tool attached to the housing. The inserted tool may any one of the following:
 inspection tools, for example higher resolution cameras than that found on the guide tube, florescent penetrant inspection (FPI), or eddy current tools, prior to or after blend operations;
 blend repair tools, including: grinding, milling or other cleaning tools such as chemical or ultrasonic cleaning tools to smooth or prepare a notch or other defect; local metal deposition processes such as laser welding, laser bracing, electro spark deposition to restore an original geometry of a blade or vane; local adaptive machining to restore original geometry; local surface treatment such as heat treatment and peening; and local coating replacement, i.e. touch up;
 cleaning tools used without blend operations, for example to remove contaminants or build up on blades.

The repair kit thus has ability to perform the following tasks in an autonomous or semi-automated process for on-wing or near wing applications:
 visual airfoil inspections,
 identification and localization of damages,
 damage analysis, definition of the optimum blend geometry and blend operation, quality control and documentation All the tools above may have their own actuators and work in conjunction with the guide tube motors or actuators.

Moreover, several repair kits could be used to handle several inspection and repair tasks in parallel by installing more tools on the engine module that work simultaneously, e.g. visual inspection of all high pressure compressor stages.

The present invention also provides a method for inspecting and repairing turbomachinery comprising:

placing the guide system above an access port in the turbomachinery casing and securing the guide system via the attachment to the casing;

inspecting a turbomachinery component with the guide system or an inspection tool inserted into a hollow tube of the guide system;

inserting a repair tool into the hollow tube of the guide system, the repair tool being secured with respect to the guide system; and repairing a damaged or contaminated turbomachinery component using the repair tool.

BRIEF DESCRIPTION OF THE DRAWINGS

An embodiment of the present invention will be described in the following figures with reference airfoil stages within a compressor assembly equipped with a typical borescope access, entering the flowpath between guide vanes, and in which.

DETAILED DESCRIPTION

Figure 1:
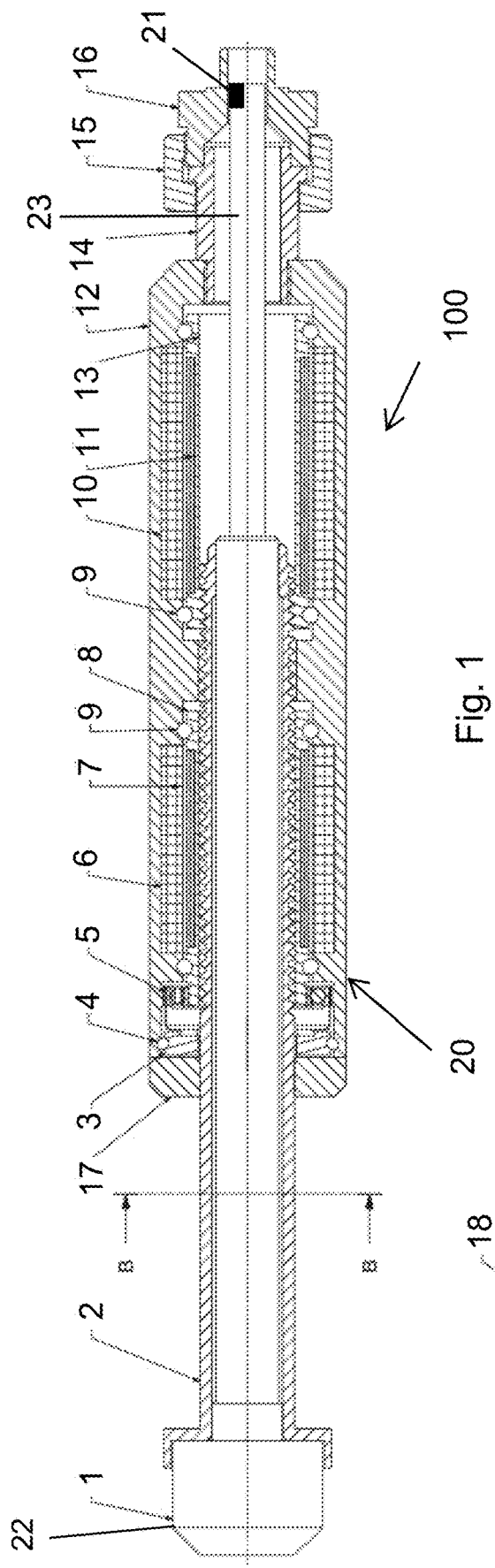
FIG. 1 shows in schematic cross-sectional side view of one embodiment of the guide system of the present invention with an inspection camera as an inserted tool.

FIG. 1 shows in schematic cross-sectional side view of one embodiment of the repair kit 100 of the present invention, the repair kit 100 including a guide system 20 and an inserted tool 1 including e.g. an inspection camera 21.

Figure 3:
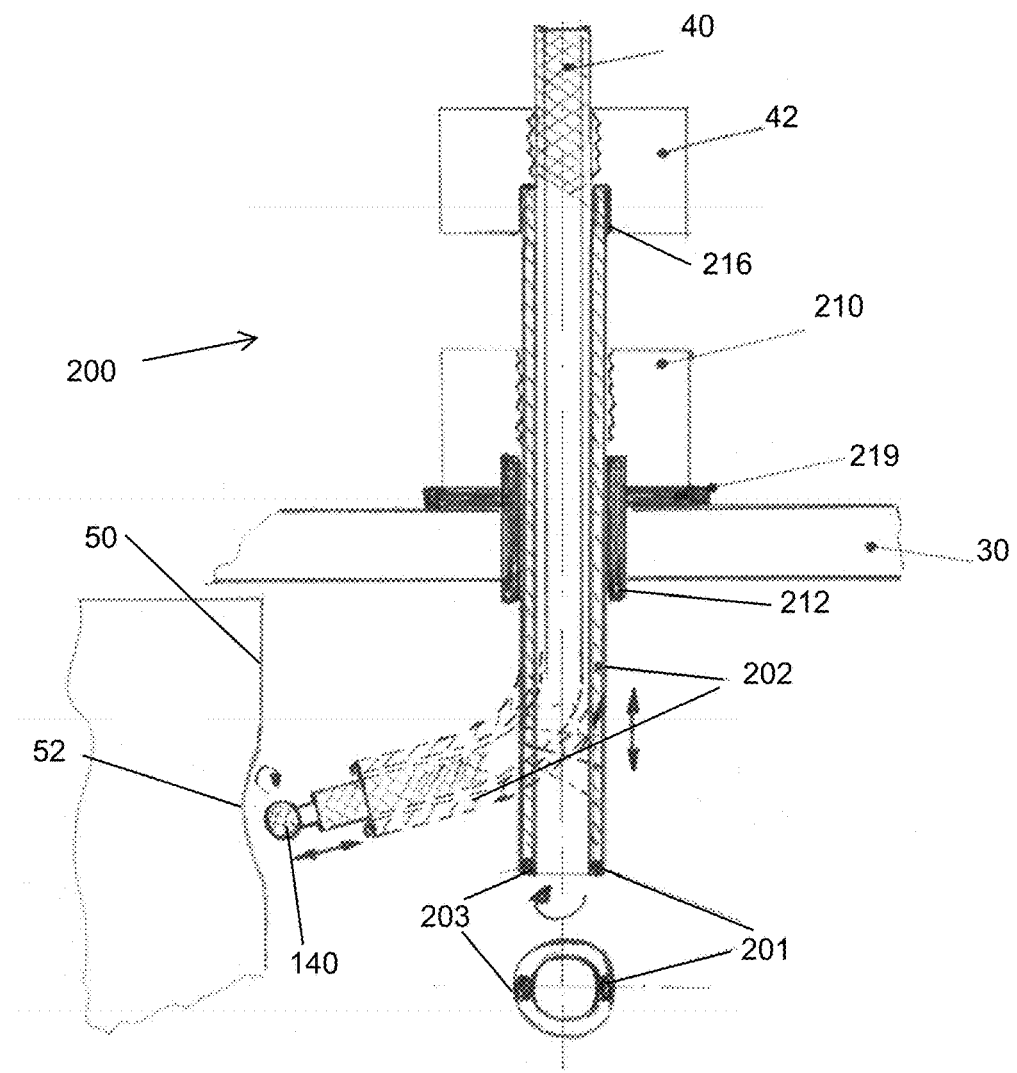
FIG. 3 shows a schematic cross-sectional side view of a second embodiment of the guide system of the present invention attached to a compressor case, and having a blend tool inserted therein for repairing a rotor blade.

Guide system 20 is attached at a borescope hole of a compressor case using an adaptor 16 that attaches fixedly in the borescope hole in an engine casing such as a compressor case (such as compressor case 30 in FIG. 3). A quickclamp 15 can fix a connection sleeve 14 to adaptor 16, for example via a threaded connection. Connection sleeve 14 can be fixed to a housing 12 and thus guide system 20 can be supported on the engine casing. An additional external support bracket can help stabilize the repair kit 100 by supporting housing 12.

In this embodiment, e.g. the camera 21 and its components, including an attachment head 22 and working tube 23, are inserted into a proximal end of a guide tube 2 of the guide system 20. Attachment head 22 can be fixed in any manner to a widened proximal end of guide tube 2, and its working tube or shaft 23 can have multiple diameter sections to permit a narrower end with the camera 21 to fit through a hole in borescope adaptor 16.

Housing 12 supports bearings 9 and windings 10. A permanent magnet 11 is supported on a rotor ring 13 with an internal thread and supported rotationally with bearings 9 in housing 12. Windings 10, magnet 11 and rotor ring 13 thus define an axial or linear motor that can move guide tube 2 axially via interaction of external threads on guide tube 2 with internal threads of rotor ring 13. When guide tube 2 is fixed rotationally, the guide tube 2 can thus slide back and forth axially along the longitudinal axis of guide tube 2. Elements 9, 10, 11, 13 thus define a linear motor.

Housing 12 also supports a winding 6 and a permanent magnet 7 that can be supported on a rotor ring 8 to permit rotational movement. Winding 6, permanent magnet 7 and rotor ring 8, with bearings 9, thus define a rotational motor, and rotation of rotor ring 8 drives the wave generator 5, which transfers via a form fitting connection (see FIG. 2), a rotation to guide tube 2. A seal 3 and bearings 4 can seal the housing 12 at the proximal end.

Axial and radial movements can also occur simultaneously, and camera 21 thus can move linearly into the engine casing as guide tube 2 moves and rotate therein. Inspection tool 1 can also have its own motor or actuators to cause the camera 21 for example to move with respect to guide tube 2.

A sensor cap 17 in this embodiment can house a measurement system for the rotational position and the linear position of guide tube 2.

For attachment of further tools, such as a blend tool, tool 1 with inspection camera 21 is removed and new tools inserted, into the proximal end of the guide tube 2.

Figure 2:
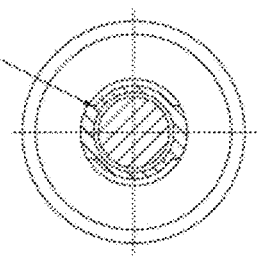
FIG. 2 shows the B-B cross section of FIG. 1.

FIG. 2 shows the B-B cross section of FIG. 1, showing the guide tube with a distortion lock against wave generator or flex spline 5, with a tongue 18 interacting with a groove in wave generator 5.

FIG. 3 shows a schematic cross-sectional side view of a second embodiment 200 of the guide system of the present invention attached to a compressor case 30, and having a blend tool 40 inserted therein for repairing a rotor blade 50.

In this embodiment, a camera 201 and a light source 203 are integrated at a distal end of guide tube 202, which can be similar to guide tube 2 but does not have a radially expanded area at the distal end. Rather the distal end has similar dimensions to the rest of guide tube 202 as shown. Controller 210 for guide tube 202 can include similar motors as in the FIG. 1 embodiment to allow axial, rotational and bending movement of guide tube 202.

A housing attachment 219 can fix the housing 212 of guide system 200 to the compressor case 30.

A tool attachment 216 can support a tool controller 42 with a drive and control unit for the blend tool 40. Blend tool 40 for example can be a grinder for smoothing a damaged area 52 of a trailing edge of rotor blade 50, and via controller can rotate and move axially in and out of guide tube 202. Blend tool 40 in this embodiment can be a flexible rotating shaft system, which is encased in a module that connects with and fits at least partially inside guide tube 202. The blend tool module maneuvers a grinding tool 140 in the axial direction and also controls the speed of the flexible shaft/grinding tool. Guide system 200 and the blend tool module can work in conjunction to maneuver the grinding tool to create a repair per predetermined blend geometry on either the trailing edges or leading edges of airfoils (upstream and downstream respectively, relative to the position of the repair tool/borescope port).

Figure 4:
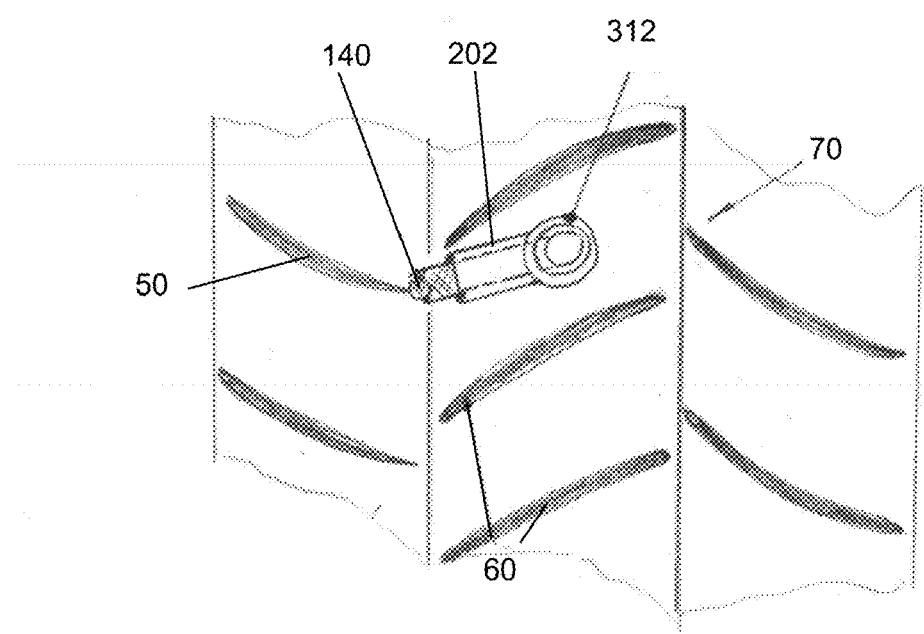
FIG. 4 shows a schematic top view of the FIG. 3 embodiment.

FIG. 4 shows a schematic top view of the FIG. 3 embodiment, and shows guide system 200 with blend tool 40, defining a second embodiment of the repair kit, entering through a borescope port 312 between stator vanes 60 to allow repair of blade 40. A further rotor stage 70 downstream of the stator vanes 60 can also be worked on by the repair kit, and several repair kits can operate in parallel to repair various leading and trailing edge, and other, defects.

Tools in the repair kit are dimensionally tailored to individual compressor stages with regards to its internal and external environment, anchoring to the compressor by direct attachment to the borescope access ports. If necessary, an external support bracket (also tailored to the engine module/ assembly) is capable of providing additional support to repair kits installed on the same engine assembly at the same time.

The repair kit of the present invention allows for maneuvering within the flowpath for the precise positioning and movement of cameras and tools, necessary for inspections (Stereoscopic and 3D) and conducting blend repairs. The guide system also provides the flexibility to bend the guide tube to an extent that allows a camera or tool to look/reach upstream (to reach the trailing edge of upstream rotor blade) or look/reach downstream (to reach leading edge of downstream rotor blade).

Servo motors (attached to each of the guide system and the working tool modules) control the movement of the guide tube and working tool are controlled by a computer program that executes steps in each of controllers 210, 42 for the guide system and the working tool, respectively. The program steps allow the repair kit to perform the following:

a full visual inspection of each airfoil in a rotor stage.

blade step rotation of the compressor rotating assembly (turn rotating assembly so that each blade in a stage can be inspected).

marking the starting airfoil for tracking and documentation purposes.

identify if airfoils require blend repairs.

compare the results of visual inspections (nicks, dents, curled or missing material) to the new part or predetermined used part geometry.

prescribe and conduct predefined blend repairs that are within the confines of predetermined structural and aerodynamic limits (per maintenance manual).

re-inspect, measure and record repairs.

upload documentation regarding the repair directly a shared database.

Based on the measurements of the damage and the available new part or used part geometry data, the program determines the best blend geometry and selects appropriate steps to be performed by one or more repair tools, which can be manually inserted one after the other through the guide system.

Blend repairs conducted by the repair kit are conducted if the damage is within established repairable limits and according to pre-established blend allowances. Blend limits are dependent on various factors, such as individual stress/ vibration characteristics and impacts on operability and performance. The sizes and number of blend repairs maybe limited per stage or engine hardware component. The analysis program can optimize the repairs for each engine type and can consider the individual performance, age and prior repairs of the affected engine. This enables the possibility to expand blend limits and guarantee safety during operation.

What is claimed is:

1. A guide system for repairing turbomachinery comprising:
    a housing securable to a turbomachinery casing;
    a camera;
    a working tool module;
    a guide tube having a hollow interior for accepting the working tool module, the guide tube having a hollow proximal end for receiving the working tool module, the guide tube having a hollow distal end forming a tubular distal facing surface, a lens of the camera and a light source integrated into the tubular distal facing surface, the housing at least partially surrounding the guide tube, the guide tube having a bendable section to move the hollow distal end with respect to a longitudinal axis of the guide tube;
    an axial motor for moving the guide tube axially with respect to the housing; and
    a rotational motor for rotating the guide tube with respect to the housing;
    wherein the working tool module has a motor controller adapted to move the working tool module rotationally with respect to the guide tube and axially in and out of the guide tube.

2. The guide system as recited in claim 1 further comprising a controller adapted to receive information from the integrated camera and for moving the guide tube within the turbomachinery casing to specified axial and radial locations within the casing.

3. The guide system as recited in claim 1 wherein the working tool module is secured to the housing.

4. The guide system as recited in claim 1 wherein the distal facing surface has a circular end surface, the integrated camera being located on the circular end surface.

5. The guide system as recited in claim 1 wherein the distal facing surface has a circular end surface, the light source being located on the circular end surface.

6. The guide system as recited in claim 1, further comprising
    an adapter fixedly attachable to a borescope hole in the turbomachinery casing;
    a connection sleeve fixed to the housing and to the adapter.

7. The guide system of claim 1, wherein:
    the axial motor is a linear motor including first windings, first bearings, a first permanent magnet and a first motor ring, the housing supporting said first windings and first bearings, the first permanent magnet supported on the first rotor ring, the first rotor ring supported by the first bearings, wherein external threads of the guide tube interact with internal threads of the first rotor ring to move the guide tube axially.

8. The guide system of claim 1, wherein:
    the rotational motor includes second windings, second bearings, a second permanent magnet and a second motor ring, the housing supporting said second windings and second bearings, the second permanent magnet supported on the second rotor ring, the second rotor ring supported by the first bearings, wherein the second rotor ring rotates the guide tube.

9. A repair kit for turbomachinery comprising: the guide system as recited in claim 1, and the working tool module, the working tool module being attached to the housing and at least partially inserted through the guide tube.

10. The repair kit as recited in claim 9 wherein the working tool module includes an inspection tool selected from the group consisting of cameras, florescent penetrant inspection tools, and eddy current tools.

11. The repair kit as recited in claim 9 wherein the working tool module includes a blend repair tool selected from the group consisting of cleaning tools, metal deposition tools, adaptive machining tools, surface treatment tools and coating replacement tools.

12. A method for inspecting and repairing turbomachinery comprising:

placing the guide system as recited in claim 1 at an access port in a turbomachinery casing and securing the guide system to the casing;

inspecting a turbomachinery component with the guide system or an inspection tool inserted into the guide tube;

inserting a repair tool into the guide tube, the repair tool being secured with respect to the housing; and repairing a damaged or contaminated turbomachinery component using the repair tool.

\* \* \* \* \*